United States Patent [19]

Rocha et al.

[11] Patent Number: 5,077,460
[45] Date of Patent: Dec. 31, 1991

[54] HEATABLE TURNTABLE

[76] Inventors: Octavio Rocha, Monte Capitolio No. 232, Piso No. 23 Condominio La Diana, Col. Fuentes Del Valle; Serafin C. Espinoza, Via Arsinaria No. 315, Col Fuentes Del Valle, both of Garza Garcia, N.L. C.P. 66220, Mexico

[21] Appl. No.: 538,018

[22] Filed: Jun. 12, 1990

Related U.S. Application Data

[63] Continuation-in-part of Ser. No. 319,045, Mar. 6, 1989, abandoned.

[51] Int. Cl.⁵ .................. H05B 3/86; H05B 1/00
[52] U.S. Cl. .................. 219/217; 219/218
[58] Field of Search ............. 219/218, 217, 214, 457

[56] References Cited

U.S. PATENT DOCUMENTS

| | | | |
|---|---|---|---|
| 1,158,475 | 11/1915 | Fox | 219/218 |
| 2,061,637 | 11/1936 | Schulz | 219/218 |
| 2,139,153 | 12/1938 | Frolich | 219/218 |
| 2,236,406 | 3/1941 | Ireland | 99/328 |
| 2,866,956 | 8/1956 | Miller et al. | 219/218 |
| 2,897,330 | 7/1959 | Hopkins | 219/218 |
| 3,233,079 | 2/1966 | Wunderlen | 219/521 |
| 3,617,693 | 6/1970 | Shimosawa | 219/218 |
| 4,034,200 | 7/1977 | Visagie | 219/218 |
| 4,910,372 | 3/1990 | Vukich | 219/218 |

Primary Examiner—Teresa J. Walberg
Assistant Examiner—Tuan Vinh To
Attorney, Agent, or Firm—Watson, Cole, Grindle & Watson

[57] ABSTRACT

A heatable turntable is provided for efficiently warming and serving food. A deck is rotatably mounted on a base. Electrical current is supplied from a power supply in the deck to thermal pads located in the deck via wires connected to sliding pole pieces attached to the base and deck. Individual thermostat is provided for each thermal pad to prevent overheating when a pad is unoccupied. Each thermal pad is located within a recess in the deck such that each pad extends out of the recess to permit air to flow between the deck and an object placed on the pad, whereby efficient heat exchange is promoted. Also, each thermal pad has a heating element comprising a resistance plate sandwiched between two mica insulation plates. The heating surface of each pad can be concave shaped towards this sandwich and has a lower lip which compresses the sandwich towards the heating surface. In addition, the sandwich is biased towards the concave heating surface by a screw actuated bracket. A system of heating turntables is also provided by electrically interconnecting a plurality of turntables.

20 Claims, 7 Drawing Sheets

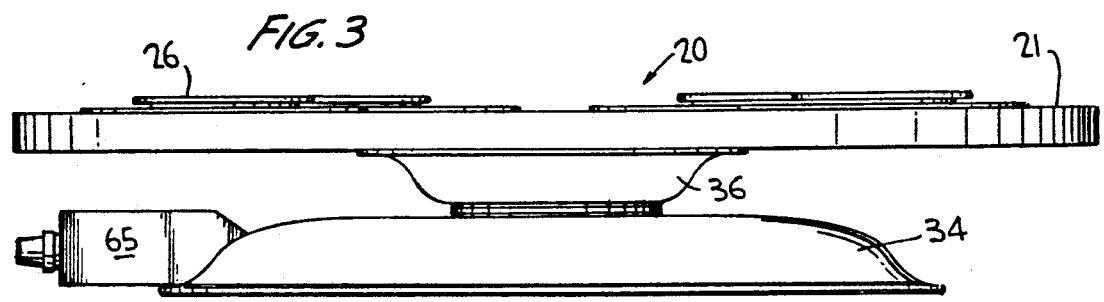
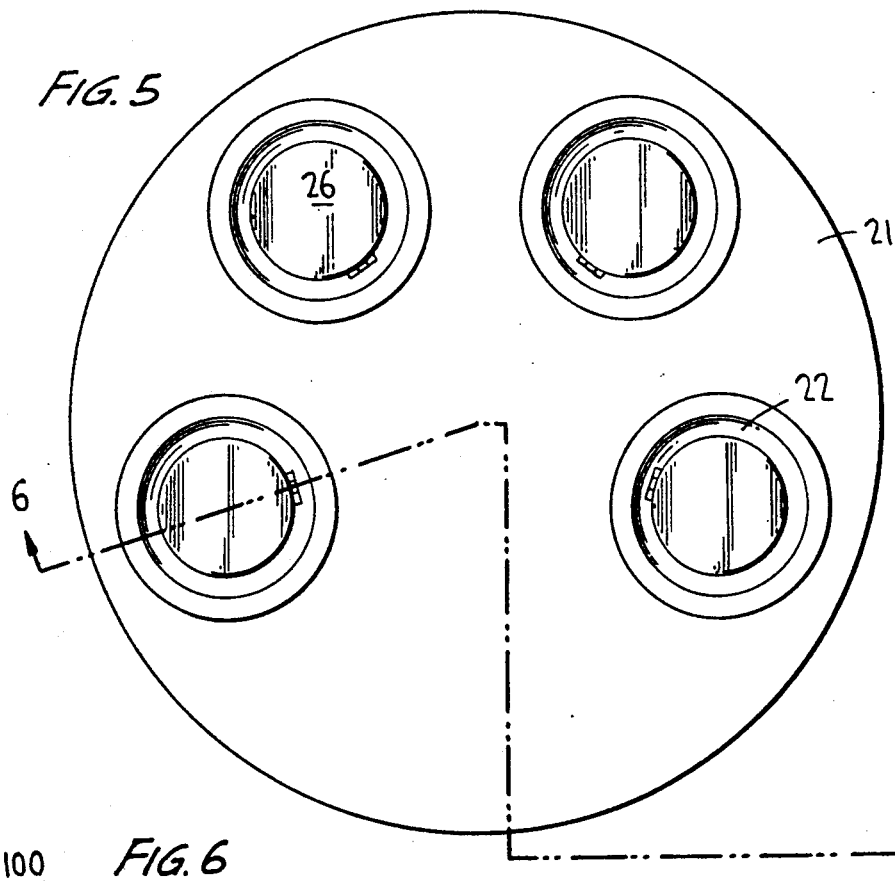
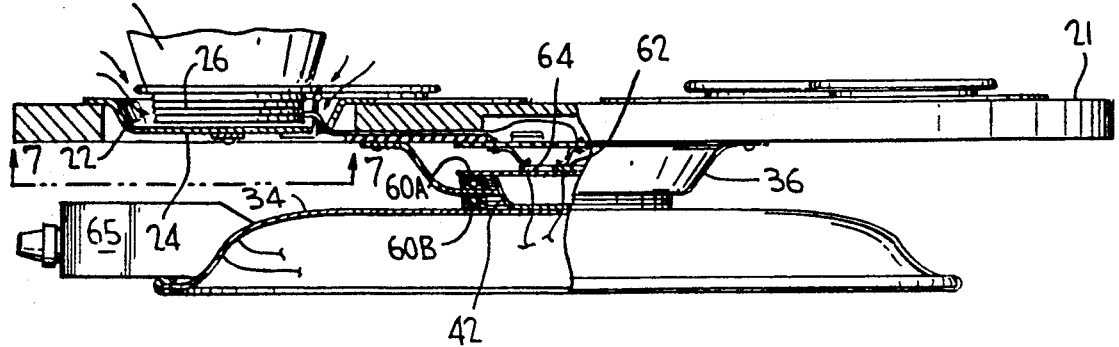

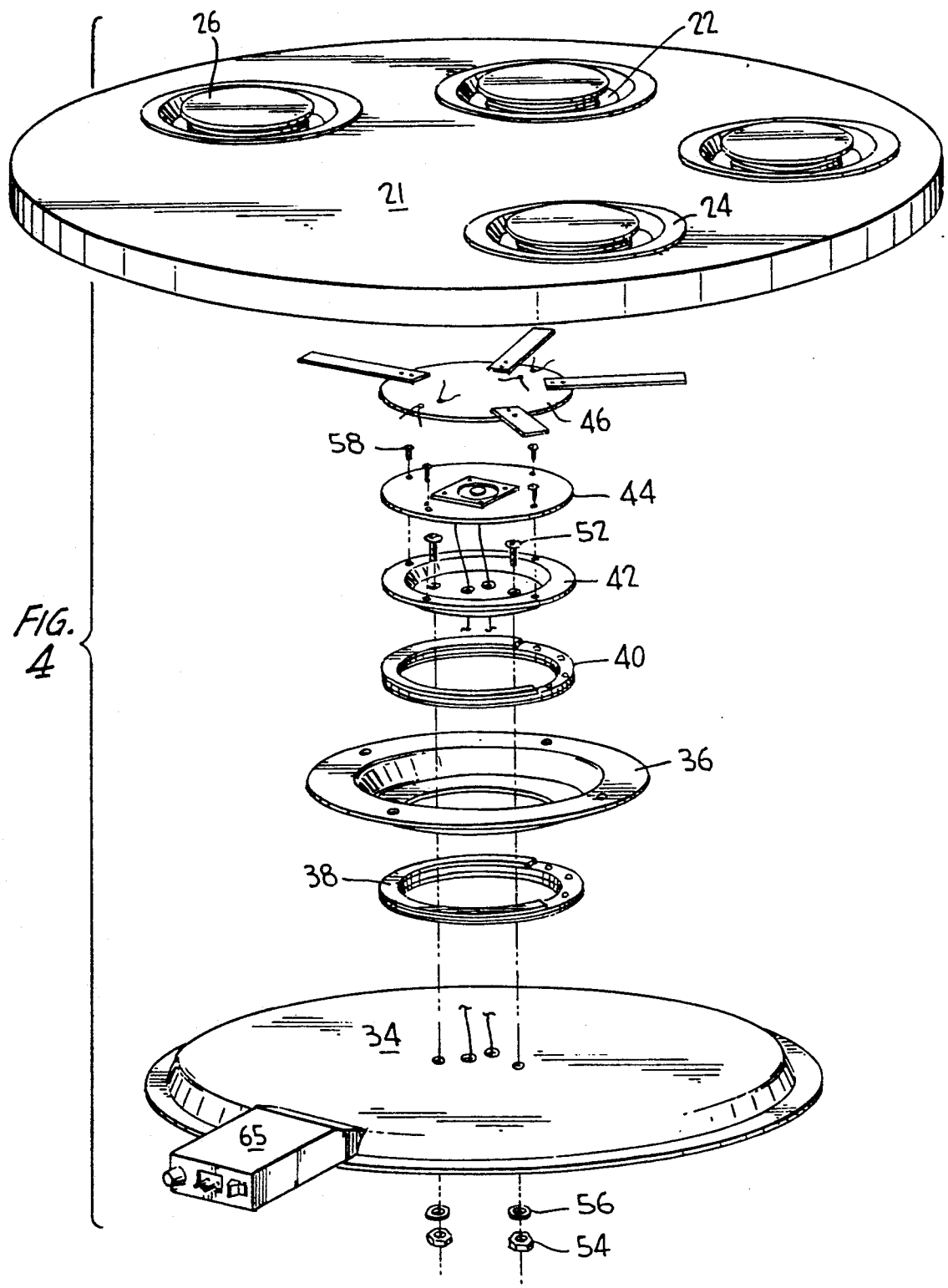

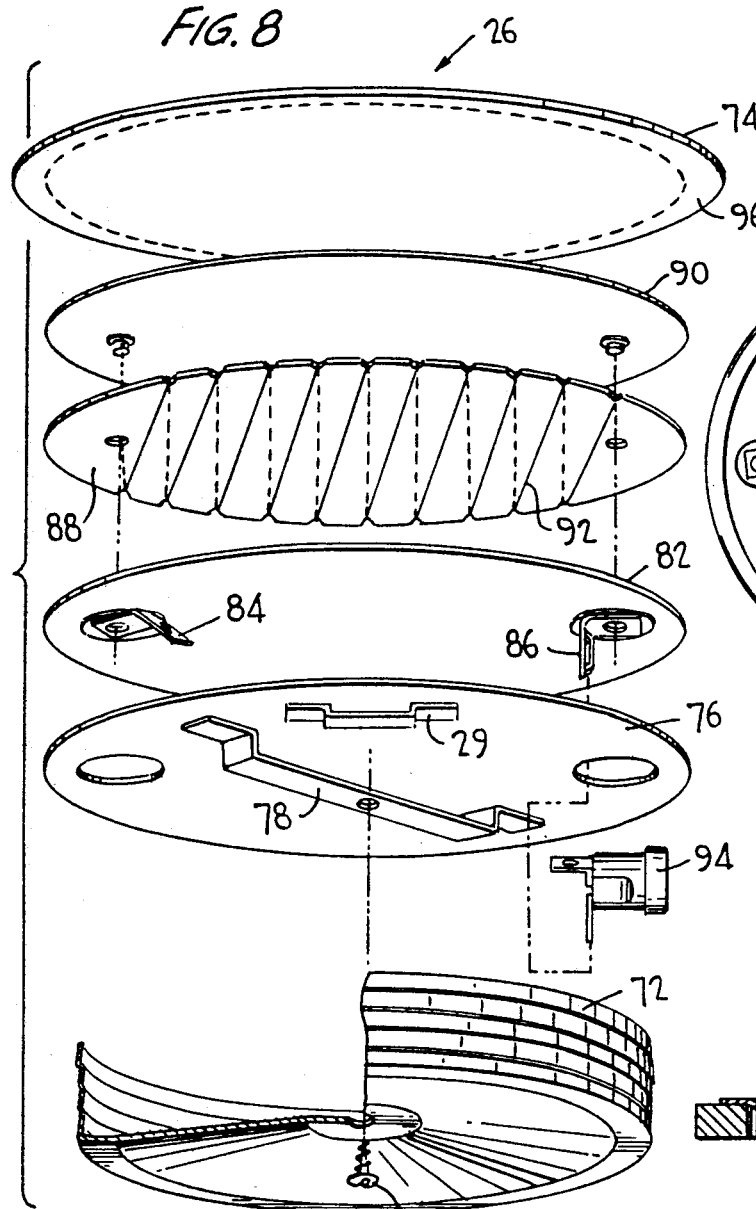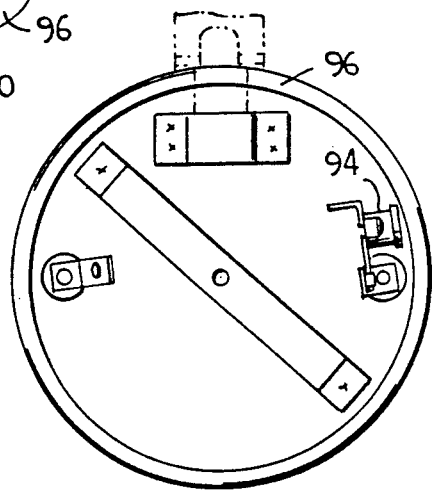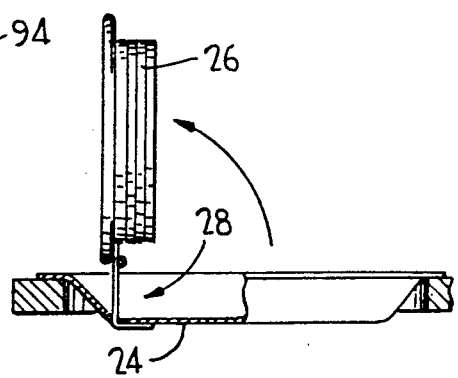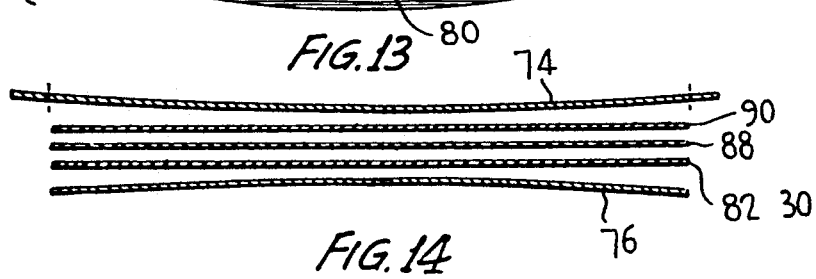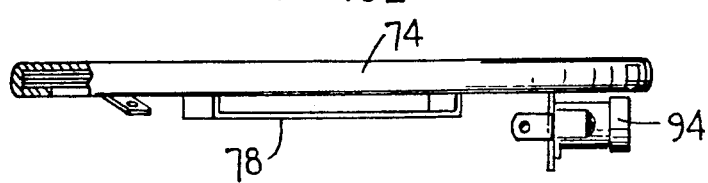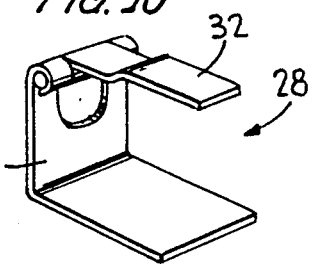

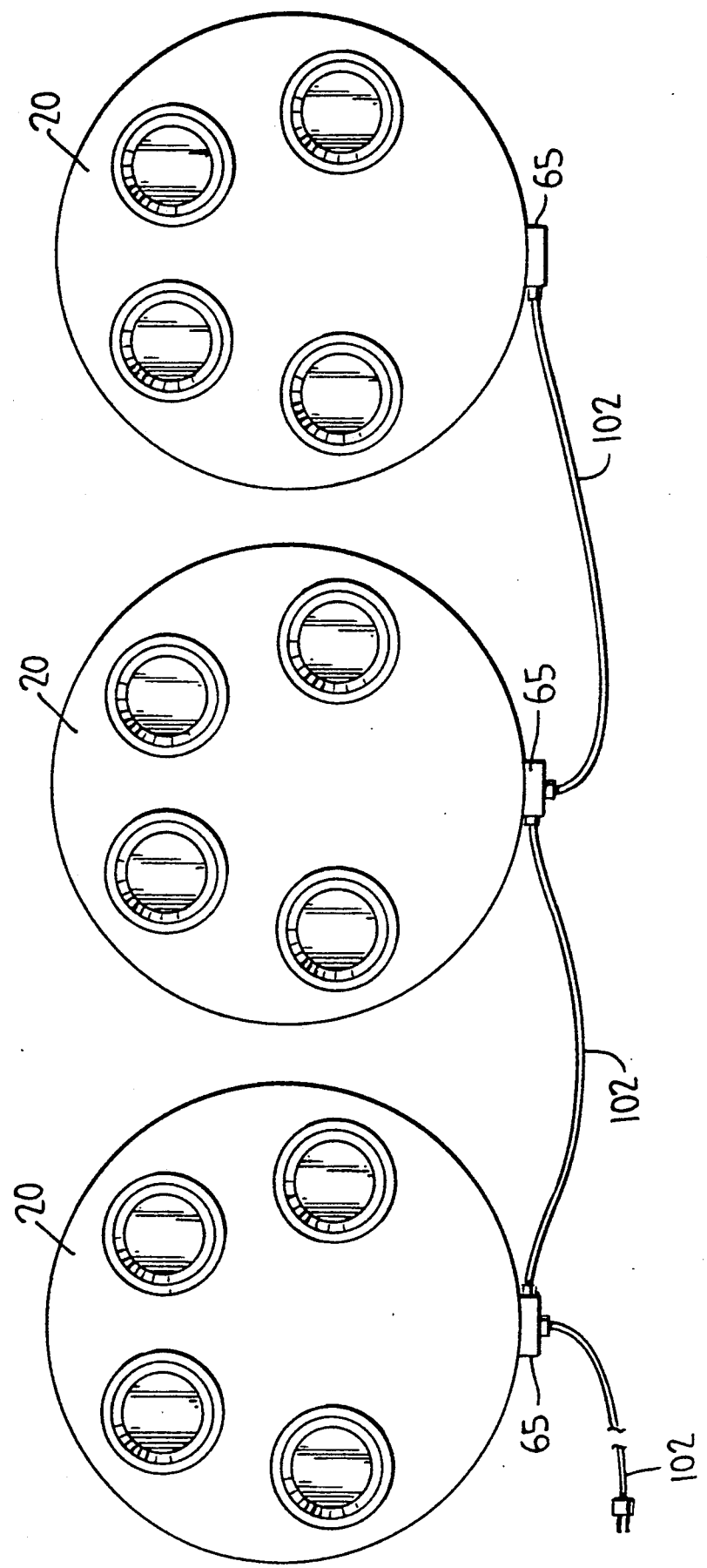

HEATABLE TURNTABLE

This application is a continuation-in-part application of U.S. Ser. No. 319,045, filed Mar. 6, 1989 now abandoned.

BACKGROUND OF THE INVENTION

This invention relates generally to a heatable turntable of the Lazy Susan type for supporting articles such as food-stuffs and other articles to be warmed on the turntable.

Turntables of this general type are basically known as having a support base to which a deck is mounted for rotation about the central axis of the deck. The turntable is utilized principally on tables such that all those seated at the table can have access to different ingredients which are placed on the turntable deck, typically known as a Lazy Susan. However, it would be desirable to provide for the heating or warming of the articles supported on the rotating deck such that the articles, such as food, can be kept hot while being served.

Several heatable turntables are known and basically comprise electrically heated pads mounted on rotating discs. However, conventional heatable turntables suffer from several drawbacks. First, air flow is often restricted between the dish placed on the heating pad and the deck. Such a restriction results in an undesirable heat build-up beneath the dish as well as inconsistent heat transfer between the pad and those portions of the dish not contacting the pad.

Also, the heating pads are not reliable since the resistor wires located therein often become disconnected and/or displaced. Disconnected resistor wires both create safety hazards such as potential electrical shocks and fire causing sparks and can result in termination of the heating operation. Displaced resistor wires result in an undesired alteration of the heating pattern and ultimately result in unevenly warmed food. In addition, conventional heating pads are often cumbersome and occupy unnecessary amounts of space, thereby detracting from both the space efficiency and aesthetic qualities of the turntable.

In addition, conventional heating pads often fail to provide for intimate contact between the warming plate and the resistance wires, thereby wasting energy as the wires heat intermediate air. Also, conventional turntables employ a universal thermostat. During operation, an occupied thermal pad is cooled as it warms a dish while an unoccupied thermal pad is cooled to a much lesser degree as it exchanges heat with the air. Thus, if a universal temperature control is provided, the unoccupied thermal pad will be heated above the predetermined warming temperature as the occupied pad or pads is/are heated to the warming temperature, thereby wasting energy. The occupied pad(s) will accordingly be underheated and the unoccupied pad(s) overheated.

Accordingly, it is an object of the present invention to provide a heatable turntable which avoids heat build-up.

It is another object of the present invention to provide a heatable turntable which evenly and consistently warms a dish.

It is a further object of the present invention to provide a reliable, safe heating mechanism for a heatable turntable.

It is yet another object of the present invention to minimize space requirements of the various elements of a heatable turntable.

It is a still further object of the present invention to accomplish the foregoing objects while improving the visual presentation of the heatable turntable to the user.

Additional objects are apparent from the specification and drawings which follow.

SUMMARY OF THE INVENTION

The foregoing and additional objects are achieved by a thermal pad according to the present invention which comprises a heating surface plate, a heating element comprising a resistance plate sandwiched between two insulation plates, means for biasing the heating element towards the heating surface plate, and means for supplying electrical power to the resistance plate of the heating element. The heating surface plate is substantially concave shaped towards the heating element.

Also, the heating surface plate has a lower lip which compresses a heating element sandwich comprising a resistor plate sandwiched between mica insulation plates together and which fixes this sandwich tightly against the inner surface of the heating surface plate. In addition, the heating pad further comprises a thermostat for maintaining the temperature of the heating surface plate at a predetermined value to avoid underheating and overheating, independently of each of the several pads of the turntable.

A turntable for heating articles is also provided and includes a base and a deck mounted on the base for rotation about a central axis of the deck. A plurality of spaced thermal pads are mounted in respective recesses in the deck such that each pad extends out of each recess to permit air to flow into the recess between the deck and an article placed on the pad. The pad and deck rotate together and each pad contains an electrical heating element. First positive and negative pole pieces are fixedly mounted on the base and second positive and negative pole pieces are mounted on the deck for rotation together therewith. Pairs of electrical lines extend from the heating elements of the pads through the deck and are connected respectively to the second pole pieces. The second pole pieces are respectively in sliding contact with the first pole pieces during rotational movement of the deck. Also, electrical lines having an on-off switch are provided for connecting said first pole pieces with a source of electrical current. A system of turntables may be provided by electrically interconnecting a plurality of these turntables.

BRIEF DESCRIPTION OF THE DRAWINGS

FIG. 3 is a front view of another embodiment of the present invention;

FIG. 4 is an exploded view of the turntable of this other embodiment;

FIG. 5 is a top view of this second embodiment;

FIG. 6 is a front view, partly in section, of this second embodiment;

FIG. 8 is an exploded view of the thermal pad according to the present invention;

FIG. 9 is a side view, partly in section, showing the thermal pad hingeably received in a recess on the turntable deck;

FIG. 10 is a perspective view of a hinge for the heating pad;

FIG. 13 is an exposed side view of the sandwiched heating elements of the thermal pad;

FIG. 14 is a side view of the sandwiched heating elements of the thermal pad;

FIG. 15 is a bottom view of the sandwiched heating elements of the thermal pad; and FIG. 16 is top view of a system of interconnected heatable turntables according to the present invention.

DETAILED DESCRIPTION OF THE PREFERRED EMBODIMENTS

Figure 1:
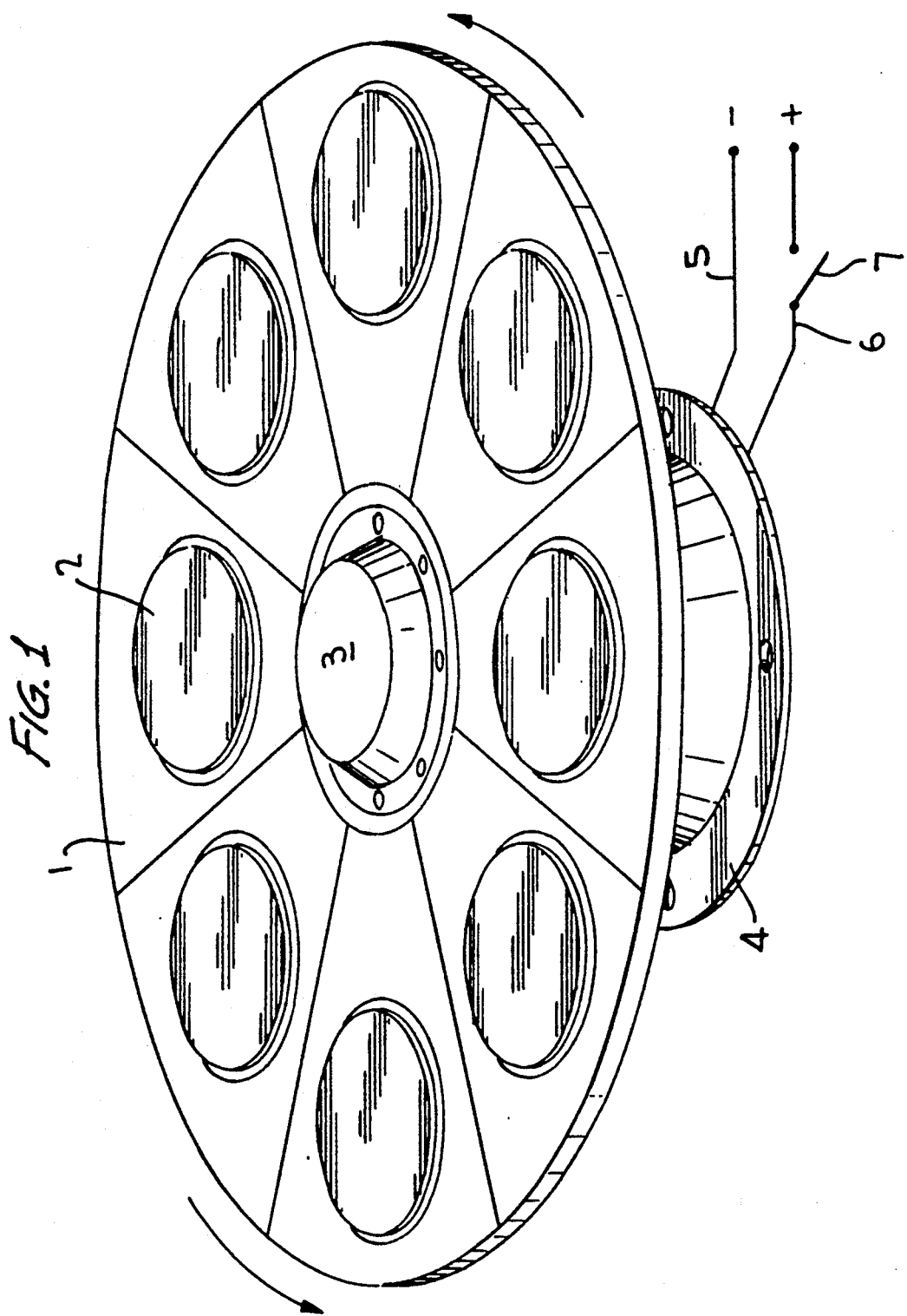
FIG. 1 is a front perspective view of a turntable according to the invention.

Referring to FIG. 1, the turntable includes an upper rotatable deck 1 on which are fixedly mounted a plurality of spaced thermal pads 2 which may be heated by electric resistance wires embedded therein, or which may be otherwise heated by heaters fueled by solid or liquid substances.

Figure 2:
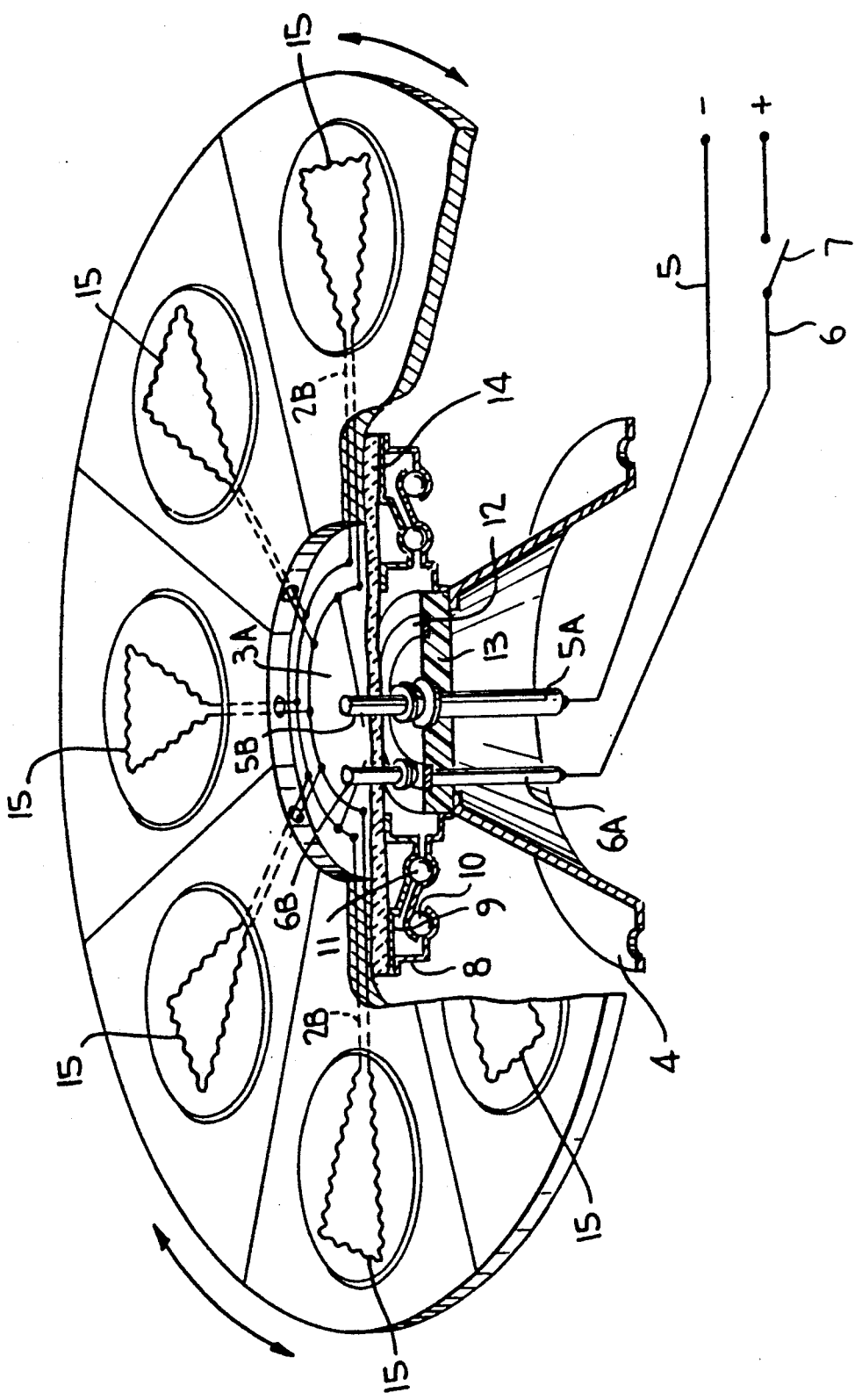
FIG. 2 is a view similar to FIG. 1, partly broken away, showing the pole pieces, resistance wires and electrical feed lines.
Figure 12:
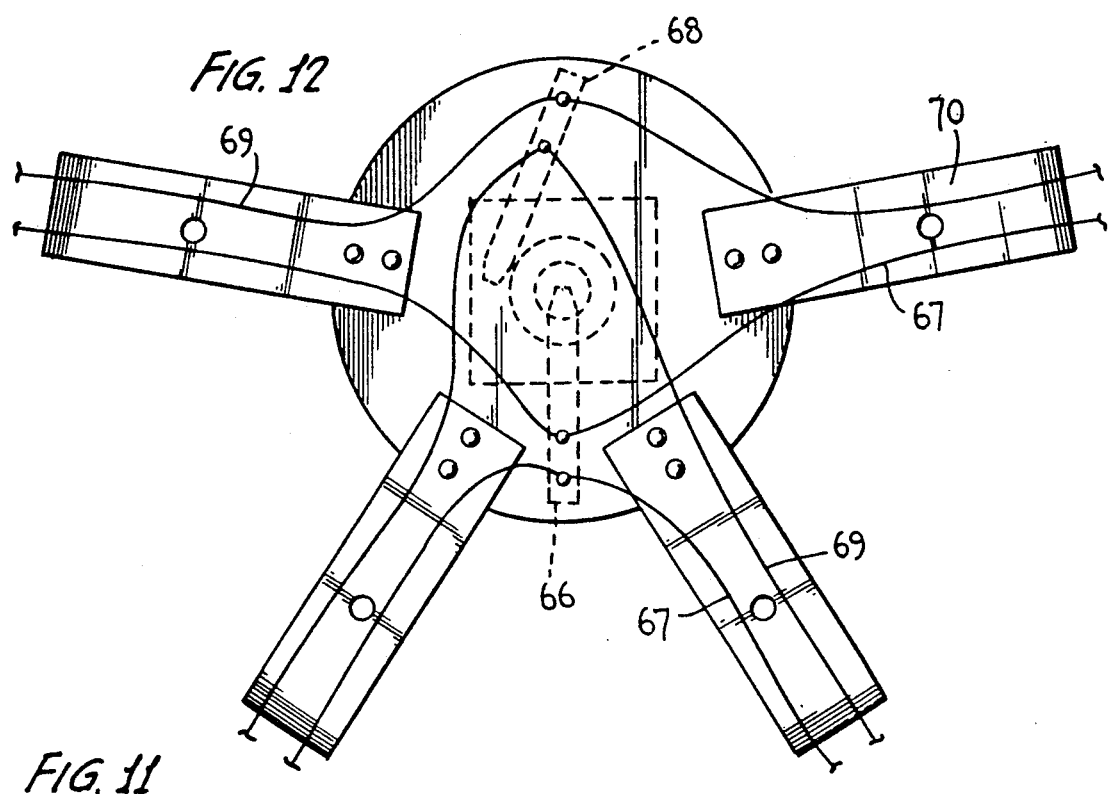
FIG. 12 is a top view of this electrical connection of FIG. 11.

The thermal pads, shown heated electrically, are mounted on the deck for rotation together therewith making it possible to alternate the position of each pad to one seated at a table, for example, as may become necessary. A removable lid 3 is mounted at the central portion of the deck for covering the central electrical system 3A, and may be secured to the deck by screws, rivets or the like. FIG. 2 shows central electrical system 3A with lid 3 removed.

The deck is rotatably mounted on a base 4 and, by the provision of a main brace 9, is supported on bearings 10 and 11 arranged in a circular array and located in a channel 8 mounted to the brace which facilitates antifriction rotation of the deck about its central axis.

Each thermal pad 2 has embedded therein a heating resistance wire 15 each having pairs of wires 2B embedded in the deck and extending into a central opening of the deck in which the central electrical system 3A is located. The system comprises first negative and positive pole pieces 5A and 6A mounted on support 4 and being connected to a source of electrical current via lines 5 and 6, the latter having an on-off switch 7. The system further comprises second negative and positive pole pieces 5B and 6B mounted on the deck for rotation together therewith.

Pole pieces 5B and 6B are respectively in sliding contact with pole pieces 5A and 6A during rotational movement of the deck. For this purpose, pole pieces 5A and 5B are located along the central axis of the deck and may have flat confronting ends in sliding rotational contact with one another. Pole pieces 6A and 6B are radially spaced from the deck's central axis, and a ferrous metal ring 12 is mounted on support 4 in contact with pole piece 6A and has a radius equal to the radial spacing of pole piece 6A from the central axis. Pole piece 6B has a flat lower end which slides along ring 12 during rotation of the deck One of the wire pairs 2B is connected to pole piece 6B, and the other of the wires of this wire pair is connected to pole piece 5B.

Bearing 11 has a fixed lower main brace by means of which the deck is supported on base 4. To insulate the positive and negative electrical connections from one another, as well as between the deck and the base, insulation material 13 is provided in the support in which ring 12 is mounted, and an insulator disc 14 is located between the deck and the base for insulating the heat pads of the deck from the base and for avoiding short circuits or operational failures of resistance wires 15.

Figure 7:
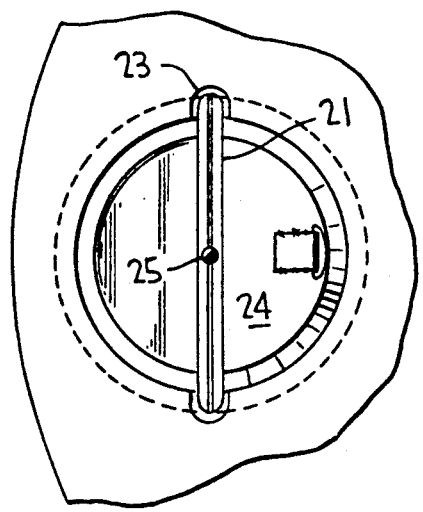
FIG. 7 is a bottom view of a thermal pad of this second embodiment.

Referring now to FIGS. 4-15, another embodiment of the present invention is shown. As shown in FIG. 4, heatable turntable 20 includes a rotatable deck 21 having recesses 22 arranged within its top surface in a predetermined pattern. In the embodiment shown, four recesses are located within the top surface and evenly spaced apart such that their centers are 72° apart, whereby an unrecessed portion of the top surface may be provided for placing serving utensils, heat resistant gloves, plates, etc. Of course, fewer or more recesses may be provided depending on the desired serving situation without departing from the invention. Deck 21 may be composed of any suitable, heat non-conducting material such as wood, ceramic or metal which permits easy clean-up and can withstand the below described warming conditions. Each recess 22 is defined by a bowl-shaped protecting shield 24 which is inserted into the deck surface. As shown in FIG. 7, bowl-shaped shields 24 are secured within recesses 22 by cross bars 21 extending across the recess and engaging notches 23 located at the recess outer circumference. Shield 24 is secured to the cross bars 21 by appropriate screws 25.

Referring to FIG. 9, thermal pads 26 may be hingeably positionable into and out of recesses 22 via hinges 28 connected therebetween. As shown in FIGS. 9 and 10, hinge 28 comprises an L-shaped member 30 and a hinge part 32. L-shaped member 30 has a first leg connected to the underside of shield 24 and second leg with a rolled end and an aperture to permit connecting wires from the thermal pad 26 to the control unit 65 to pass therethrough. Hinge part 32 is connected to this rolled end. As shown in FIG. 8, a bracket 29 may be provided on pad 26 to permit sliding connection, and disconnection if necessary, with hinge part 32. Bracket 29 is accessible through an aperture located in the thermal pad cover. Accordingly, pad 26 can be pivoted out of recess 22 to permit easy and convenient cleaning of shield 24.

Referring to FIG. 6, the depth of recess 22 and the height of pad 26 are correlated such that pad 26 extends out of the recess to permit air flow into the recess between the dish 100 and the deck 21 as indicated by the arrows. Accordingly, uniform warming of the dish occurs and the heating pad is cooled to avoid excessive heat build-up from improved heat exchange with the air. If, as in conventional turntables, the pad is flush with deck, heat build-up will occur in the recess as the dish blocks access by cooling air. Also, uneven heating occurs as the portion of the dish contacting the pad is heated significantly higher than the portion of the dish extending over the deck.

Referring once again to FIGS. 4-7, deck 21 is rotatably mounted and electrically connected to a control stand 34 via the elements described below, which are surrounded by a bowl-shaped cover 36 mechanically connected to deck 21. A rotational ring 38 is located between cover 36 and stand 34 and comprises a plastic ring having ball bearing support holes sandwiched between two metal washers. A similarly constructed rotational support ring 40 is located on the opposite side of cover 36 within the cover bowl. A recessed support plate 42 is positioned inside ring 40 and is mechanically secured to stand 34 via appropriate screws 52, nuts 54 and washers 56. A contact ring plate 44 is secured to support plate 42 by appropriate screws 58. A contact plate 46 is fixed to deck 21. As shown in FIG. 6, ball bearings 60A and 60B are respectively located within the plastic portions of rings 38 and 40, i.e., between stand 34 and cover 36 and between cover 36 and recessed support 42. Accordingly, deck 21, contact plate 46 and cover 36 may be rotated with respect to stationary stand 34, support 42 and contact ring plate 44.

Figure 11:
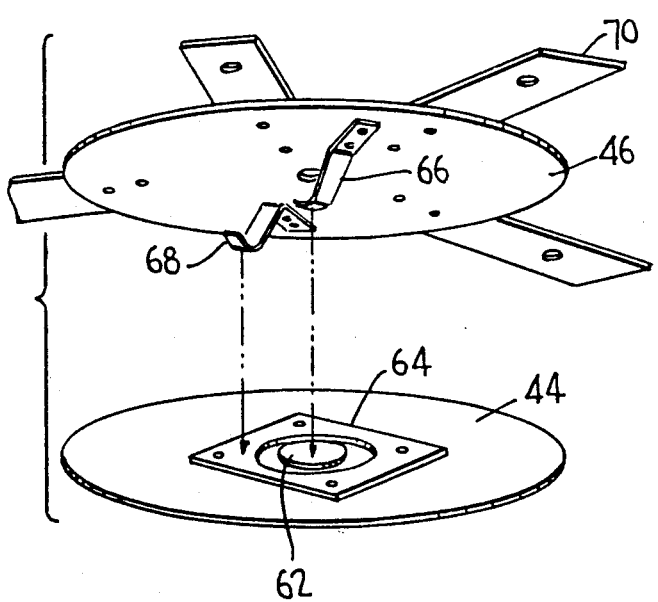
FIG. 11 is an exploded view of the sliding electrical connection of the present invention.

Turning to FIG. 11, contact ring plate 44 comprises a central contact surface 62 and an outer contact ring 64 surrounding this surface. This central surface and contact ring are electrically connected by appropriate wire pairs to positive and negative leads of a control unit 65, as shown in FIG. 6, 3 and 4. The central surface and ring respectively contact spring biased prongs or leaf springs 66 and 68, or other means to provide spring loaded contacting surfaces in order to take up wear of contact plate 46 as show in FIG. 11, which in turn are electrically connected by appropriate wire pairs to respective thermal pads 26 of FIGS. 8 and 9. Thus, electrical communication between central unit 65 and the thermal pads is maintained during rotation of deck 21 as central surface 62 and prong 66 contact and as prong 68 slides around ring 64. The spring-like function of prongs 66 and 68 allows for intimate contact to be maintained with central surface 62 and ring 64 even after these surfaces wear from repeated contact and turning. In addition, this spring-like function allows for intimate contact to be reliably and repeatably obtained during manufacturing in the event of tolerance differences between the elements of the thermal pad. Contact plate 46 is also provided with arms 70 to support and guide the respective electrical wires 67 and 69 to the thermal pads 26.

As show in FIG. 8, each thermal pad 26 comprises a cover 72 which abuts the outer periphery of a heating surface plate 74 and encloses an appropriate heating element. This heating element includes a lower support disc 76 to which hinge bracket 29 is fixed. A bracket 78 is fixed to the underside of disc 76 and is mechanically secured to the inner face of cover 72 via a screw 80 or any suitable securing means. A resistance plate 88 is sandwiched between insulation plates 82 and 90. These insulation plates may be comprised of mica because it has excellent insulating properties in a thin form, thereby conserving space. Connectors 84 and 86 are provided to permit electrical communication between electrical wires 67 and 69 and resistor wires 92 which traverse resistance plate 88, whereby wires 92 and plate 88, and ultimately surface 74, are heated. The outer circumference of plate 88 is notched to provide guidance for resistor wires 92 and to securely hold the wires 92 against plate 88. Accordingly, dislodgement and disconnection of these resistor wires is avoided.

A thermostat 94 is provided for each thermal pad 26. Each thermostat is preset to maintain the temperature of heating surface 74 at a desired point of, e.g., 65° C. By controlling the temperature of each thermal pad 26 individually, energy is conserved by avoiding an excessive heat build up in an unoccupied pad. An unoccupied thermal pad is cooled to a much lesser degree as it exchanges heat with the air. Thus, if a universal temperature control is provided, the unoccupied thermal pad will be heated above the predetermined warming temperature as the occupied pad or pads is/are heated to the warming temperature, thereby wasting energy.

Heating surface 74 has a lower lip 96 which encompasses the outer periphery of support disc 76 and thereby tightly sandwiches disc 76, mica insulation plate 82, resistor plate 88, and mica insulation plate 90 to the underside of heating surface 72.

To further ensure firm contact between these sandwiched elements and thus improve heat transfer and prevent misalignment of resistor wires 92, heating surface 76 has a substantially concave shape towards the sandwich as shown in FIG. 13. In addition, lip 96 tightly compresses these elements together. To further sandwich these elements, screw 80 biases bracket 78 attached to disc 76, and accordingly biases disc 76, towards the heating surface 76, resulting in disc 76 having a convex shape towards the sandwich.

In operation, control unit 65 is switched on to supply power from a household outlet to the unit. Heating pads 26 are then heated to the desired preset temperature to warm or maintain dishes at this temperature. As discussed above, the use of individual thermostats 94 prevent an unoccupied pad from overheating.

During banquets or other serving situations where a large number of dishes need to be warmed, it is desirable to use a several heatable turntables 20. To facilitate power supply to these turntables, they may be connected one to another in series, as shown in FIG. 16. Electrical extension cords 102 are provided having male and female ends. One male end engages a powered outlet receptacle and the other male ends engaged appropriate female receptacles in the control units 65 to supply power out. Likewise, the female ends engage male prongs in each control unit to supply power in. Thus, a plurality of turntables may be easily interconnected to provide the appropriate number of heating pads for the particular serving situation.

The present invention accordingly results in a heatable turntable which efficiently and consistently warms food while avoiding excessive heat build up and energy costs. Also, the space requirements of the unit are minimized. All of these advantages are achieved without detracting for the aesthetic presentation of the device, thereby making the unit even more desirable for use in the home and more sophisticated serving situations.

Many modifications and improvements will become apparent to one skilled in the art without departing from the spirit and scope of the present invention as defined in this description and the following claims.

We claim:

1. A turntable for heating articles comprising:
    a base;
    a deck mounted on said base for rotation about a central axis of said deck;
    a plurality of spaced thermal pads mounted in respective recesses in said deck such that each pad extends out of each recess to permit air to flow into the recess between the deck and an article placed on the pad, the pad and deck rotating together, each pad containing an electrical heating element;
    first positive and negative pole pieces fixedly mounted on said base;
    second positive and negative pole pieces mounted on said deck for rotation together therewith;
    pairs of electrical lines extending from said heating elements of said pads through said deck and connected respectively to said second pole pieces; and
    second pole pieces being respectively in sliding contact with said first pole pieces during rotational movement of said deck; and electrical lines having an on-off switch for connecting said first pole pieces with a source of electrical current.

2. The turntable according to claim 1, wherein said thermal pads each have a heating surface plate which is substantially concave shaped towards said heating element.

3. The turntable according to claim 2, wherein the two insulation plates are comprised of mica.

4. The turntable according to claim 1, wherein said thermal pads each comprise a heating surface plate and said heating elements each comprise a resistance plate connected to a respective pair of electrical lines and sandwiched between two insulation plates, said heating surface plate having a lower lip which compresses the heating element sandwich together and which fixes this sandwich tightly against said heating surface plate.

5. The turntable according to claim 1, further comprising a respective thermostat for maintaining the temperature of each of said heating elements at a predetermined value.

6. The turntable according to claim 1, further comprising a cover which surrounds said heating element, and a support plate located between the inside of the cover and said heating element, the support plate being convexly shaped towards said heating element.

7. The turntable according to claim 1, wherein said heating elements comprise a resistance plate connected to respective pairs of electrical lines and a two mica insulation plates sandwiching the resistor plate.

8. The turntable according to claim 1, wherein the electrical heating elements comprise a resistance plate having notches in its outer circumference for securing a resistance wire which traverses the resistance plate, the resistance wire connected to a respective pair of electrical lines.

9. The turntable according to claim 1, wherein the second positive and negative pole pieces each comprise a flexible leafspring.

10. A system for heating a plurality of articles, the system comprising a plurality of turntables, each turntable comprising:
a base;
a deck mounted on said base for rotation about a central axis of said deck;
a plurality of spaced thermal pads mounted in respective recesses in said deck such that each pad extends out of each recess to permit air to flow into the recess between the deck and an article placed on the pad, the pad and deck rotating together, each said pad containing an electrical heating element;
first, positive and negative pole pieces fixedly mounted on said base; and
second positive and negative pole pieces mounted on the deck for rotation together therewith, pairs of electrical lines extending from said heating elements of said pads through said deck and connected respectively to said second pole pieces, said second pole pieces being respectively in sliding contact with said first pole pieces during rotational movement of said deck; and
electrical lines having an on-off switch from connecting said first pole pieces with a source of electrical current; the system further comprising means for electrically connecting and disconnecting the turntables to and from one another.

11. The system according to claim 10, wherein said thermal pads each have a heating surface plate which is concave shaped towards said heating element.

12. The turntable according to claim 10, wherein said thermal pads each comprise a heating surface plate and said heating elements each comprise a resistance plate connected to a respective pair of electrical lines and sandwiched between two insulation plates, said heating surface plate having a lower lip which compresses the heating element sandwiched together and which fixes this sandwiched tightly against said heating surface plate.

13. The system according to claim 12, wherein the two insulation plates are comprised of mica.

14. The system according to claim 10, further comprising a respective thermostat for maintaining the temperature of each of said heating elements at a predetermined value.

15. The system according to claim 10, further comprising a cover which surrounds said heating element, and a support plate located between the inside of the cover and said heating element, the support plate being convexly shaped towards said heating element.

16. The system according to claim 15, wherein a screw actuated bracket is located between the inside of the cover and the support plate.

17. The system according to claim 10, wherein the electrical heating elements comprise a resistance plate having notches in its outer circumference for securing a resistance wire which traverses the resistance plate, the resistance wire connected to a respective pair of electrical lines.

18. The system according to claim 10, wherein the second positive and negative pole pieces each comprise a flexible leaf spring.

19. A turntable for heating articles comprising:
a base;
a deck mounted on said base for rotation about a central axis of said deck;
a plurality of spaced thermal pads mounted in respective recesses in said deck such that each pad extends out of each recess to permit air flow into the recess between the deck and an article placed on an outer surface the pad, the pad and deck rotating together; and
respective means for heating said spaced thermal pads.

20. The turntable according to claim 19, further comprising respective means for maintaining the temperature of each of said heating means at a predetermined value.

* * * * *